US011661377B2

(12) United States Patent
Balconi et al.

(10) Patent No.: US 11,661,377 B2
(45) Date of Patent: May 30, 2023

(54) SYSTEM AND METHOD FOR MANUFACTURING REINFORCING ELEMENTS FOR REINFORCED CONCRETE

(71) Applicant: SIREG GEOTECH S.R.L., Arcore (IT)

(72) Inventors: Gabriele Balconi, Arcore (IT); Flavio Bruschi, Arcore (IT)

(73) Assignee: SIREG GEOTECH S.R.L., Arcore (IT)

(*) Notice: Subject to any disclaimer, the term of this patent is extended or adjusted under 35 U.S.C. 154(b) by 180 days.

(21) Appl. No.: 17/260,703

(22) PCT Filed: May 24, 2019

(86) PCT No.: PCT/IB2019/054336
§ 371 (c)(1),
(2) Date: Jan. 15, 2021

(87) PCT Pub. No.: WO2020/016668
PCT Pub. Date: Jan. 23, 2020

(65) Prior Publication Data
US 2021/0261458 A1 Aug. 26, 2021

(30) Foreign Application Priority Data
Jul. 16, 2018 (IT) .......................... 102018000007220

(51) Int. Cl.
*B29C 70/52* (2006.01)
*C04B 20/00* (2006.01)
(Continued)

(52) U.S. Cl.
CPC ........ *C04B 20/0068* (2013.01); *B29C 70/521* (2013.01); *B29C 70/545* (2013.01);
(Continued)

(58) Field of Classification Search
CPC ............................ B29C 70/521; B29C 70/525
See application file for complete search history.

(56) References Cited

U.S. PATENT DOCUMENTS

| 5,116,450 | A | * | 5/1992 | Spoo | ..................... B29C 33/306 425/185 |
| 2010/0308147 | A1 | * | 12/2010 | Brandstrom | ........... B65H 49/30 242/174 |
| 2020/0189174 | A1 | * | 6/2020 | Bischoff | ............... B29C 53/083 |

FOREIGN PATENT DOCUMENTS

WO 2013/006964 A1 1/2013

OTHER PUBLICATIONS

International Search Report for PCT/IB2019/054336 dated Sep. 10, 2019.

* cited by examiner

*Primary Examiner* — Jeffry H Aftergut
(74) *Attorney, Agent, or Firm* — Thomas|Horstemeyer, LLP (57) ABSTRACT

A system (15) for manufacturing a reinforcing element (1) for reinforced concrete comprises a feeder (16) of a reinforcing fiber bundle (2) along a pultrusion path (4), an impregnating device (17) which impregnates the reinforcing fiber bundle (2) with a liquid thermoplastic polymeric resin (6) to obtain an impregnated fiber bundle (2), a forming channel (8) through which the impregnated fiber bundle (2) is conducted, a solidification device (19) of the composite thread (9) forming a solidified thermoplastic fiber-reinforced bar (11), a pulling device (20) which holds the reinforcing fiber bundle (2) taut along the pultrusion path (4), a winder (21) which winds the solidified bar (11) to form a coil (14), a provisional bending device (22) which bends the composite thread (9) not yet solidified or heats the solidified bar (11) to soften it, bends the heated bar (11) and then cools the bar
(Continued)

(11) to solidify it again, so as to confer a continuous provisional curvature to the solidified bar (11) in the direction of the subsequent winding in the coil (14).

34 Claims, 6 Drawing Sheets

(51) Int. Cl.
    *B29C 70/54*     (2006.01)
    *B65H 49/30*     (2006.01)
    *B65H 54/58*     (2006.01)
    *C04B 20/10*     (2006.01)
    *B29K 101/12*     (2006.01)
    *B29K 309/08*     (2006.01)
    *B29L 31/06*     (2006.01)

(52) U.S. Cl.
    CPC ............. *B65H 49/30* (2013.01); *B65H 54/58* (2013.01); *C04B 20/1014* (2013.01); *C04B 20/1029* (2013.01); *B29K 2101/12* (2013.01); *B29K 2309/08* (2013.01); *B29L 2031/06* (2013.01); *B65H 2701/313* (2013.01)

SYSTEM AND METHOD FOR MANUFACTURING REINFORCING ELEMENTS FOR REINFORCED CONCRETE

This application is the 35 U.S.C. § 371 national stage of PCT application having serial number PCT/IB2019/054336, filed on May 24, 2019. This application also claims priority to IT having serial number 102018000007220 filed on Jul. 16, 2018, which are entirely incorporated herein by reference.

The present invention relates to a system and a method for manufacturing reinforcing elements for reinforced concrete.

It is known to make reinforcing elements for reinforced concrete starting from steel reinforcing bars having material properties and geometrical properties corresponding to properties standardized in national and regional regulations for reinforced concrete structures. The steel reinforcing bars are usually made by hot rolling and then cold shaping of originally straight steel bars to form two or three-dimensional reinforcing elements. For this purpose, it is known to subject the steel bar or wire to a step of cold shaping in which the steel bar is bent when cold, e.g. by means of suitable bending machines provided with a calibrated mandrel, the diameter of which determines the bending curvature radius of the steel bar, and with a pusher member or with a guide which pushes the steel bar to bend around the calibrated mandrel.

The storage and/or transport of the steel bars before their shaping into three-dimensional reinforcing elements can occur in the form of coils wound and held together by locking bands.

The steel reinforcing elements for reinforced concrete have the advantage of a high degree of standardization and a universal manufacture, shaping and preparation, regardless of the specific geometrical shape of the final reinforcing element, always starting from a laminated steel bar.

On the other hand, the steel reinforcing elements for reinforced concrete have some drawbacks. The manufacture and transport of steel bars and reinforcing elements require considerable amounts of energy. The heavy weight of the steel increases the weight of the reinforced concrete structures for which it is intended. The handling of the steel reinforcing elements requires robust and expensive handling equipment and means. Steel is subject to corrosion and therefore requires particular storage and transportation conditions. The "spring" effect of the steel bars wound in coils constitutes a serious risk of injury to users, in particular during the winding and the binding of the coils and during unwinding of the coils.

A further disadvantage of the steel reinforcing elements consists in the great difficulty of demolishing and recycling the industrial waste of concrete structures reinforced by means of steel reinforcing elements.

It is also known to provide reinforcing elements for reinforced concrete made of composite material consisting of a thermosetting polymeric matrix and glass reinforcing fibers.

The known composite reinforcing elements are made directly in their final form and, with the exception of cutting, are not subjected to successive changes of geometric shape.

For example, straight reinforcing bars made of composite thermosetting fiber-reinforced material are made by means of a pultrusion process in which a reinforcing fiber bundle is fed in an advancement direction along a pultrusion path passing firstly through an impregnating station, in which the fiber bundle is impregnated with the liquid thermosetting polymeric resin, and subsequently through a forming and cross-linking station, in which the fiber bundle impregnated with thermosetting resin passes through a forming channel which confers the desired sectional shape to the reinforcing bar and is subjected to a heat treatment which causes, together with suitable additives of the resin, the cross-linking ("curing") of the thermosetting resin. Downstream of the forming and cross-linking station, the formed and cross-linked reinforcing bar crosses a pulling station which pulls the reinforced bar, and thus the continuous bundle of reinforcing fibers, in the advancement direction. Downstream of the pulling station, the reinforcing bar now fully formed passes through a cutting station which cuts the reinforcing bar to form straight bars of the desired length.

As previously mentioned, the composite reinforcing elements thus formed can only be used (stored, transported, embedded in the concrete) in their rectilinear shape, preventing their universal use similar to that of steel reinforcing bars which instead can be freely bent into the desired shape.

The filiform—but three-dimensionally shaped—reinforcing elements, made of composite thermosetting fiber-reinforced material, are today made only in handcrafted or semi-industrial manner in workshop conditions, e.g. for very particular applications which justify the cost of a dedicated, small series manufacturing.

For example, the filiform—but three-dimensionally shaped—reinforcing elements, made of composite thermosetting fiber-reinforced material, may be made by impregnating a reinforcing fiber bundle, laying the impregnated fiber bundle in a dedicated forming and cross-linking mold having the exact shape of the three-dimensional reinforcing element desired to be achieved.

Again, in this case, the composite three-dimensional reinforcing elements can only be used (stored, transported, embedded in the concrete) in their definitive three-dimensional shape, preventing their universal use similar to that of steel reinforcing bars which can instead be freely bent into the desired shape.

The composite fiber-reinforced reinforcing elements cannot be universally applied (manufactured, stored, transported, freely deformed) today and their manufacturing and use is not similar to that of steel reinforcing elements. This prevents their large-scale distribution and availability and prevents designers and reinforced concrete structure builders from using these reinforcing elements made of fiber-reinforced polymeric composite material, if not in exceptional cases and for special applications which justify the additional costs and attention needed today.

Additionally, since the reinforcing elements made of polymeric fiber-reinforced material are not currently available as continuous wound threads, which can be unwound and shaped as desired, their use involves high transport volumes and transport costs and a high amount of waste due to the necessary cutting to size starting from many individual reinforcement bars instead of cutting to size starting from a continuous wound thread.

On the other hand, the reinforcing elements made of composite polymeric fiber-reinforced material for reinforced concrete would have considerable advantages if they were available on large scale and if they could be used (manufactured, stored, transported, freely deformed) in a manner similar to that habitually used for steel reinforcing elements.

The manufacturing and transporting of bars and reinforcing elements made of polymeric material requires much less energy. The light weight of the fibers, e.g. glass, carbon, basalt or aramid fibers, and the light weight of the polymeric matrix reduces the weight of the reinforced concrete structures for which they are intended. A handling of reinforcing elements made of polymeric material would require much less robust and more economical equipment and handling means and would imply advantages in terms of work safety due to the light weight of the reinforcing elements. The polymeric matrix is not subject to corrosion and therefore requires no protection against the rain or humidity during storage and transport.

A particular advantage of the reinforcing elements made of polymeric fiber-reinforced material consists in the ease of demolition of concrete structures reinforced with such polymeric reinforcing elements and in the ease of recycling of the polymeric bar scraps.

In the light of the advantages and drawbacks of the known solutions for manufacturing and using reinforcing elements for reinforced concrete, it is the object of the invention to provide new and improved systems and methods for manufacturing reinforcing elements for reinforced concrete.

To better understand the invention and appreciate its advantages, a description of some embodiments of the manufacturing method and manufacturing system of the reinforcing element for reinforced concrete will be provided below by way of non-limiting example with reference to the accompanying figures, in which.

With reference to the figures, a method for manufacturing a reinforcing element 1 for reinforced concrete in the form of a shaped bar with at least one bend, comprises:
conveying a reinforcing fiber bundle 2 in an advancement direction 3 along a pultrusion path 4,
in an impregnating position 5 along the pultrusion path 4, impregnating the reinforcing fiber bundle 2 with a liquid thermoplastic polymeric resin 6 so as to obtain a fiber bundle 2 impregnated with resin 6,
in a forming position 7 along the pultrusion path 4 downstream of the impregnation position 5, conveying the fiber bundle 2 impregnated with resin 6 through a forming channel 8 so as to form a composite thread 9 not yet solidified with a sectional shape determined by the forming channel 8,
in a solidification position 10 along the pultrusion path 4 either downstream or at the forming position 7, subjecting the composite thread 9 to a solidification treatment, so as to form a solidified, thermoplastic fiber-reinforced bar 11,
in a pulling position 12 along the pultrusion path 4 downstream of the solidification position 10, applying a pulling force in the advancement direction 3 to the solidified bar 11 to hold the reinforcing fiber bundle 2 taut along the pultrusion path 4 and to convey the solidified bar 11 towards a winding position 13,
in the winding position 13, winding the solidified bar 11 to form a coil 14 of said solidified bar 11,
in a provisional bending position 23 upstream of the winding position 13:
bending the composite thread 9 not yet solidified or heating the solidified bar 11 to soften it, bending the heated bar 11 and then cooling the bar 11 to solidify it again, so as to confer to the solidified bar 11 a continuous provisional curvature in the direction of the subsequent winding in the coil 14.

In this manner, it is possible to produce, with a single, universally applicable method and system, a thermoplastic fiber-reinforced bar 11 provisionally wound in a coil 14 for successive universal use as reinforcing elements 1 for reinforced concrete. The provisional bending of the fiber-reinforced thermoplastic bar 11 in non-solidified condition either eliminates or reduces undesired elastic winding tensions and therefore prevents polymeric material creep.

The fiber-reinforced thermoplastic bar 11 provisionally wound in a coil 14 may be stored and transported as chosen by the user, without particular protection against atmospheric effects and without any risk of corrosion.

Finally, the fiber-reinforced thermoplastic bar 11 provisionally wound in a coil 14 may be successively heated and shaped as desired and cut to desired lengths without producing waste material.

In particular, it is worth noting that the provisional bending of the thermoplastic bar 11 reinforced with fibers 2 also avoids an excessive accumulation of elastic energy in the wound coil 14 and therefore the "spring" effect and the risk of injury to the user.

According to a further aspect of the invention, which can be advantageously applied to reinforcing bars of reduced diameters (e.g. up to 13 mm in diameter) in which a moderate curvature does not generate such elastic tensions as to cause undesired creep, the method may include the elimination of a provisional bending upstream of the winding position 13 and, instead, include the winding of the solidified bar 11 in the winding position to form a coil 14 of said solidified bar 11 so as to confer a continuous (provisional) elastic curvature to the solidified bar 11 in the direction of the winding in the coil 14.

Either additionally or alternatively, and therefore also without the characteristics and limitations of the steps of provisional manufacturing described hereto, the manufacturing method of a reinforcing element 1 for reinforced concrete in the form of a bar shaped with at least one bend, comprises:

providing a coil 14 of thermoplastic fiber-reinforced bar 11, wherein:

the bar 11 comprises a solidified thermoplastic polymeric matrix 6 and a fiber bundle 2 impregnated with the polymer matrix 6 and extended in a longitudinal direction of the bar 11, in elastically non-deformed state, the bar 11 comprises a continuous provisional curvature in the winding direction of the coil 14, unwinding the bar 11 from the coil 14 and conveying the unwound bar 11 in an advancement direction 3' along a shaping path 24, in a shaping position 26 along the shaping path 24, locally heating the bar 11 to soften it, bending the locally heated bar 11 to achieve a definitive local bend 25 and then cooling the bar 11 at the definitive local bend 25 to solidify it, in a cutting position 27 along the shaping path 24, cutting the unwound bar 11 to obtain a single reinforcing element 1.

Optionally, the method may comprise the step of repeating at a plurality of sections of the bar 11 the steps of locally heating the bar 11 to soften it, of bending the locally heated bar 11 to make a definitive local bend 25 and successively of cooling the bar 11 at the definitive local bend 25 to solidify it, so as to obtain said single reinforcing element 1 with a plurality of said definitive local bends 25.

Optionally, the method may comprise the step of:
in a straightening position 28 along the shaping path 24 upstream of the shaping position 26, heating the bar 11 to soften it, straightening the heated bar 11 to eliminate the provisional curvature and then cooling the straightened bar 11 to solidify it again.

In this manner, it is possible to produce, with a single universally applicable method and system, a reinforcing element 1 for reinforced concrete made of thermoplastic polymeric fiber-reinforced material and bent in definitive manner for use. The bending assisted by heating and cooling allows a preparation and a use of the reinforcing elements 1 in industrialized manner similar to that habitually used for steel reinforcing elements.

The method and the system avoid the problem of having to fabricate, store and transport the reinforcing elements 1 from the outset in their definitive shape and allows an industrial customization of the reinforcing elements 1 after mass industrial manufacturing of the provisional reinforcing bar 11.

Finally, the reinforcing elements 1 made of polymeric fiber-reinforced material can be customized (definitive shaping) in relative proximity to the place of use and away from the manufacturing site.

This opens the way for a universal use and for an industrialization of the steps of manufacturing, storage, transporting and customizing of the reinforcing elements 1 made of fiber-reinforced polymer, this condition being favorable for their wide distribution and mass availability.

Similarly, a system 15 for manufacturing a reinforcing element 1 for reinforced concrete in the form of a bar shaped with at least one bend, comprises a provisional manufacturing assembly 15' with:

a fiber feeder 16 which feeds a reinforcing fiber bundle 2 in an advancement direction 3 along a pultrusion path 4, an impregnating device 17 arranged in an impregnating position 5 along the pultrusion path 4, which impregnates the reinforcing fiber bundle 2 with a liquid thermoplastic polymeric resin 6 so as to obtain a fiber bundle 2 impregnated with resin 6, a forming device 18, arranged in a forming position 7 along the pultrusion path 4 downstream of the impregnation position 5, which comprises a forming channel 8 through which the fiber bundle 2 impregnated with resin 6 is conveyed so as to form a composite thread 9 not yet solidified with a sectional shape determined by the forming channel 8, a solidification device 19, arranged in a solidification position 10 along the pultrusion path 4 either downstream or at the forming position 7, which performs a solidification treatment on the composite thread 9, so as to form a solidified, thermoplastic, fiber-reinforced bar 11, a pulling device 20, arranged in a pulling position 12 along the pultrusion path 4 downstream of the solidification position 10, which applies a pulling force on the solidified bar 11 in the advancement direction 3 which holds the reinforcing fiber bundle 2 taut along the pultrusion path 4 and conveys the solidified bar 11 towards a winding position 13, a winder 21, arranged in the winding position 13, which winds the solidified bar 11 to form a coil 14 of said solidified bar 11, a provisional bending device 22, arranged in a provisional bending position 23 upstream of the winding position 13, and that:

bends the composite thread 9 not yet solidified or
heats the solidified bar 11 to soften it, bends the heated bar 11 and then cools the bar 11 to solidify it again, so as to confer to the solidified bar 11 a continuous provisional curvature in the direction of the subsequent winding in the coil 14.

According to a further aspect of the invention, which can be advantageously applied to reinforcing bars of reduced diameters (e.g. up to 13 mm in diameter) in which a moderate curvature does not generate such elastic tensions as to cause undesired creep, the system 15 may be without a provisional bending 22 upstream of the winding position 13 and, instead, envisage that the winder 21, arranged in the winding position, winds the solidified bar 11 to form a coil 14 of said solidified bar 11 so as to confer a continuous (provisional) elastic curvature in the direction of the winding in the coil 14 to the solidified bar 11.

Either alternatively or additionally, and therefore also without the characteristics and limitations of the provisional manufacturing assembly 15' as described hereto, the system 1 for manufacturing a reinforcing element 1 for reinforced concrete comprises a definitive shaping assembly 15" to make reinforcing elements 1 in the form of bar shaped with at least one bend, starting from a coil 14 of fiber-reinforced thermoplastic bar 11, wherein:

the bar 11 comprises a solidified thermoplastic polymeric matrix 6 and a reinforcing fiber bundle 2 impregnated by the polymer matrix 6 and extended in a longitudinal direction of the bar 11, in elastically non-deformed state, the bar 11 comprises a continuous provisional curvature in the winding direction of the coil 14, wherein, the definitive shaping assembly 15" comprises:

an unwinding device 29, which supports the coil 14 and unwinds the bar 11 from the coil 14 and feeds the unwound bar 11 in an advancement direction 3' along a shaping path 24, at least one shaping device 30, arranged in a shaping position 26 along the shaping path 24, and which locally heats the bar 11 to soften it, bends the locally heated bar 11 to achieve a definitive local bend 25 and then cools the bar 11 at the definitive local bend 25 to solidify it again, a cutting device 31, arranged in a cutting position 27 along the shaping path 24, which cuts the unwound bar 11 to obtain a single reinforcing element 1.

Optionally, the definitive shaping assembly 15" further comprises a straightening device 32, arranged in a straightening position 28 along the shaping path 24 upstream of the shaping position 26, and which heats the bar 11 to soften it, straightens the heated bar 11 to eliminate the provisional curvature and then cools the straightened bar 11 to solidify it again.

Advantageously, the at least one shaping device 30 repeats the local heating of the bar 11 to soften it, the curvature of the locally heated bar 11 to make the definitive local bend 25 and the successive cooling of the bar 11 at the definitive local bend 25 to solidify it at a plurality of sections of the bar 11, so as to obtain the single reinforcing element 1 with a plurality of said definitive local bends 25 and/or so as to perform said operations in succession on a plurality of said reinforcing elements 1.

Detailed Description of the Method and the Provisional Manufacturing Assembly 15'

According to an embodiment, the fiber feeder 16 comprises a creel with a battery of one or more reels 33 of fibers 2 and one or more redirecting and guiding surfaces 34 which guide and join the fibers 2 unwound from the reels 33 to form the reinforcing fiber bundle 2. The fibers themselves may be provided in the form of threads 35 of fibers. Each thread 35 may, for example, have a diameter in the range from 1 mm to 2 mm and contain, for example, a plurality of thousands of single fibers having a diameter in the range from 10 micrometers to 20 micrometers, e.g. about 17 micrometers. The individual fiber threads 35 are unwound from the individual reels 33 and guided by the redirecting and guiding surfaces 34 so as to converge into a single reinforcing fiber bundle 2.

Either alternatively or additionally, the system may comprise a device 76, e.g. an oven for the production of glass thread or for the production of fibers or fiber filaments in general, arranged upstream of the fiber feeder 16 and configured to make said reinforcing fibers 2. This allows a continuous production without the steps of winding and intermediate storing of the reinforcing fibers 2.

The reinforcing fibers 2 may include glass fibers, carbon or graphite fibers or synthetic fibers, e.g. Kev® are (registered trademark by DuPont®), or basalt fibers, or aramid fibers or natural fibers or fibers made of cellulose.

According to a preferred embodiment, the feeding of the reinforcing fiber bundle 2 takes place in a continuous manner.

According to an embodiment, the impregnating device 17 comprises one or more soaking tanks 36 which receive the liquid polymeric resin, as well as a singling system 37 associated with each impregnation tank 36, e.g. a comb, which separates/moves away single threads 35 or single portions of the fiber bundle 2 from one another and guides them through the impregnation tank 36, so as to ensure a full impregnation of the reinforcing fibers with the liquid polymeric resin.

Either alternatively or additionally, the impregnating device 17 comprises one or more impregnation chambers 36' (which may, in turn, form soaking tanks 36) with an injection system 38 which injects under pressure the liquid polymeric resin into the space crossed by the reinforcing fiber bundle 2, and possibly with a singling system 37, e.g. a comb, which separates/moves away single threads 35 or single portions of the fiber bundle 2 from one another and guides them through the impregnation tank 36, so as to ensure a full impregnation of the reinforcing fibers with the liquid polymeric resin.

According to an embodiment, the liquid thermoplastic polymer resin for impregnating the reinforcing fiber bundle 2 may comprise a thermoplastic resin obtained by heating and thus softening of thermoplastic granules, e.g. by means of a primary heating device 39 (e.g. a friction conveying screw and/or an electric resistor and/or a circuit of a heating fluid in a heat exchange relationship with the thermoplastic polymeric granulate along a path of the thermoplastic polymer resin towards the impregnation position 5 associated with the impregnating device 17.

According to a further embodiment, the liquid thermoplastic polymer resin for impregnating the reinforcing fiber bundle 2 may comprise a resin precursor, e.g. containing one or more different types of monomers in a mixture and/or solution, liquid and not yet cured. In the present description the term "liquid thermoplastic polymer resin" also includes such thermoplastic resin precursors not yet polymerized but intended to be successively polymerized.

The thermoplastic polymer resin may comprise one or more of polyamide, polypropylene, acrylic polymer, PEEK (polyether ether ketone).

Advantageously, the impregnating device 17 operates continuously.

According to an embodiment, the forming channel 8 may comprise a tubular preforming section 40 which confers the desired external dimensions to the composite thread 9 by pressing and compacting the reinforcing fibers 2.

Figure 9:
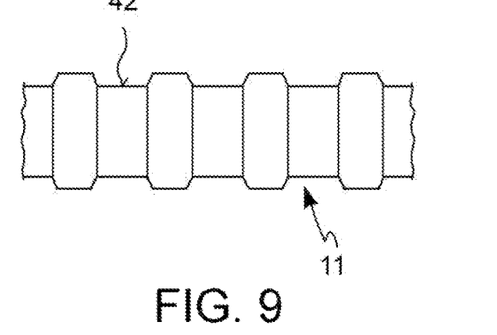
FIG. 9 shows an outer surface, provided with a non-slip profile (enlarged) of the reinforcement element for reinforced concrete made using the system and method according to embodiments.

According to a further embodiment, the forming channel 8 may comprise a profiling section 41 with one or more profiling molds, e.g. in a double belt profiling mold system, which impart a relief or low-relief, non-slip profile to an outer surface 42 of the composite thread 9 (FIG. 9).

Advantageously, the forming device 18 operates continuously.

According to an embodiment, the solidification device 19 comprises a coolable mold 43 which may have the shape of the cross section of the bar 11, in which the cooling of the coolable mold 43 causes the solidification of the thermoplastic polymer resin to form a solidified thermoplastic polymeric matrix. For such purpose, the coolable mold 43 may comprise a cooling system 44 with a refrigerant fluid circuit in heat exchange relationship with the thermoplastic polymer resin inside the coolable mold 43.

According to an embodiment, the solidification device 19 comprises a heatable mold 43' which may have the shape of the cross section of the bar 11, in which the high temperature of the heatable mold 43 causes the polymerization of the resin precursor to form a thermoplastic polymeric matrix. For this purpose, the heatable mold 43' may comprise a heating system 45 with a heating electric resistor and/or a circuit for a heating fluid in a heat exchange relationship with the resin precursor inside the coolable mold 43'.

According to an embodiment, the solidification device 19 may be integrated directly in the forming device 18.

Advantageously, the solidification device 19 operates continuously.

According to an embodiment, the pulling device 20 comprises one or more jaws or gripping surfaces 46, preferably opposite, and actuated so as to engage the outer surface 42 of the solidified bar 11 and drag the solidified bar 11 in the advancement direction 3.

According to a further embodiment, the winder 21 also performs the function of (and thus forms) the tensioning device 20. In terms of method, the solidified bar 11 is pulled by the step of winding of the solidified bar 11.

According to an embodiment, the winder 21 may comprise a coil support 47 adapted to support and retain the coil 14 being formed and a winding motor 48 connected to the coil holder 47 which can be actuated to turn the coil support 47 and/or the coil 14 so as to wind the bar 11 on the coil 14.

Advantageously, the solidification device 19 operates continuously.

Figure 3:
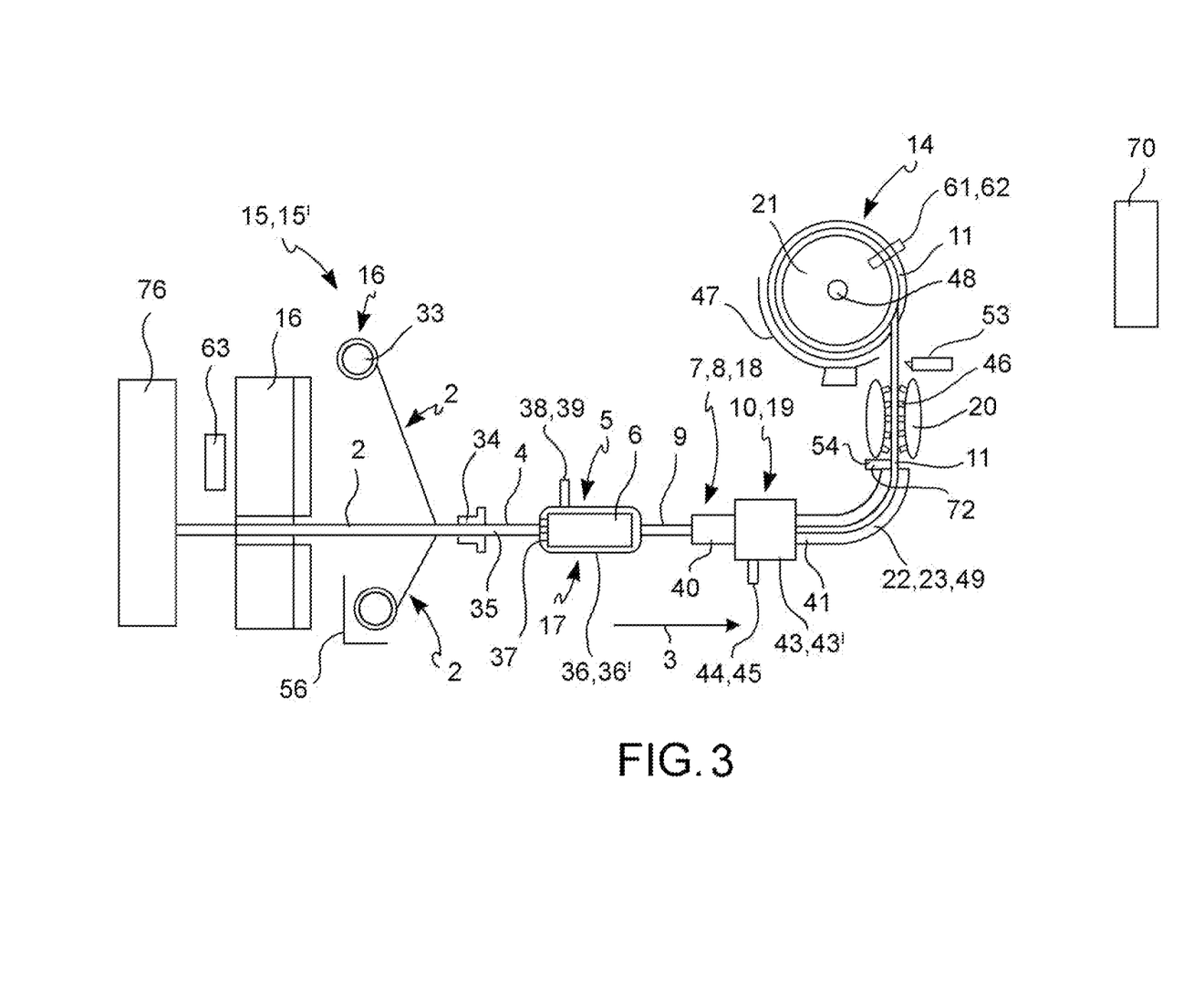
FIG. 3 is a diagrammatic view of a part of a system for manufacturing a reinforcing element for reinforced concrete, according to a yet further embodiment.

According to a further embodiment (FIG. 3), the provisional bending device 22 may comprise a bent portion 49 formed in said forming channel 8. This enables the provisional curvature in continuous manner, when the thermoplastic resin is still soft and, therefore, without first having to soften the thermoplastic resin.

According to an embodiment (FIGS. 1 and 2) the provisional bending device 22 may comprise:
  an auxiliary heating device 50 arranged downstream of the solidification position and which heats the previously solidified bar 11 to soften it in preparation for the provisional bending,
  a bending assembly 51, e.g. one or more bending rollers or opposite belts or opposite bending surfaces which force the heated bar 11 along a curved advancement section having said provisional curvature,
  an auxiliary cooling device 52 which cools the bent bar 11 to solidify it so as to preserve the provisional curvature.

Figure 1:
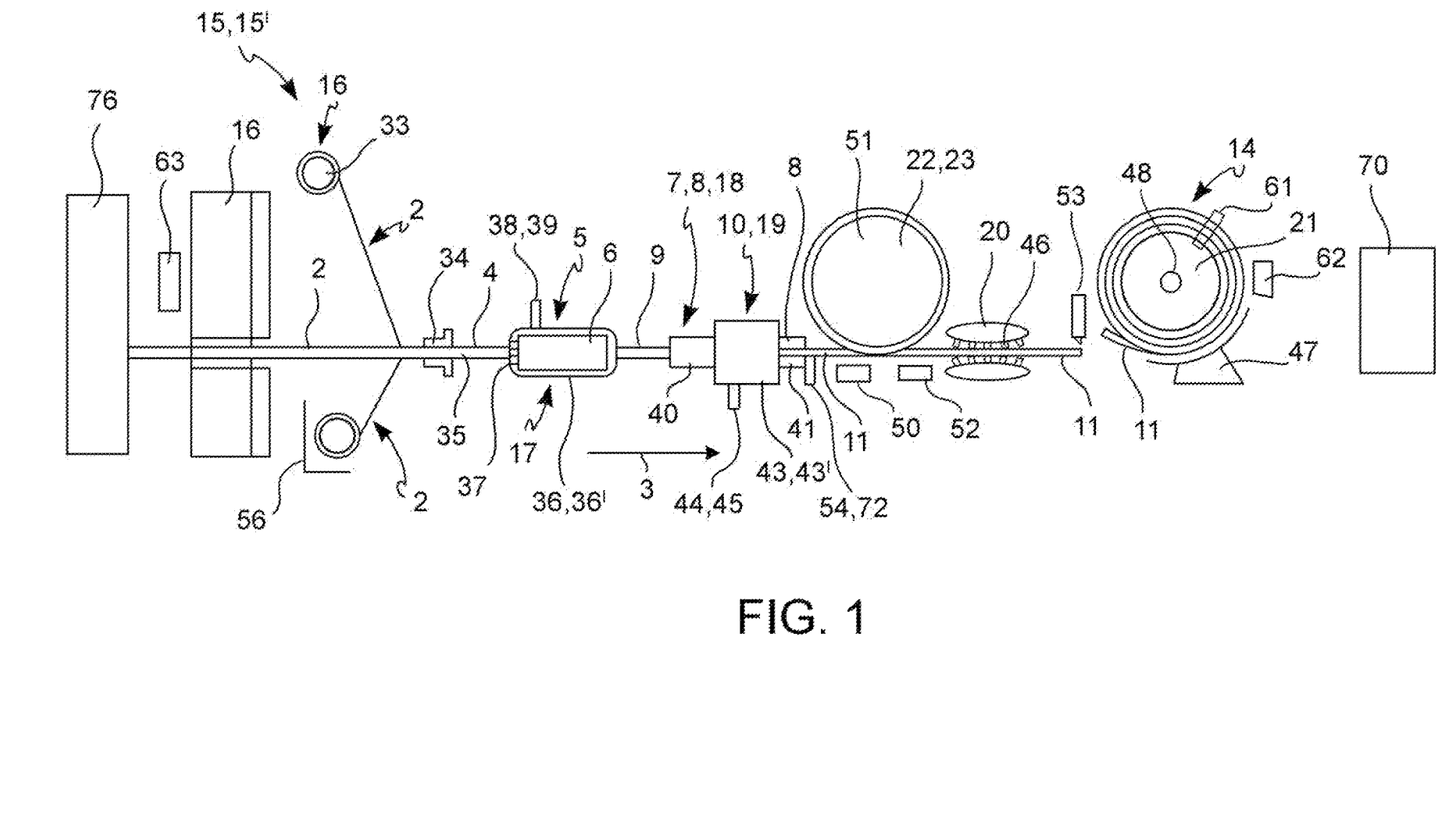
FIG. 1 is a diagrammatic view of a part of a system for manufacturing a reinforcing element for reinforced concrete, according to an embodiment.
Figure 2:
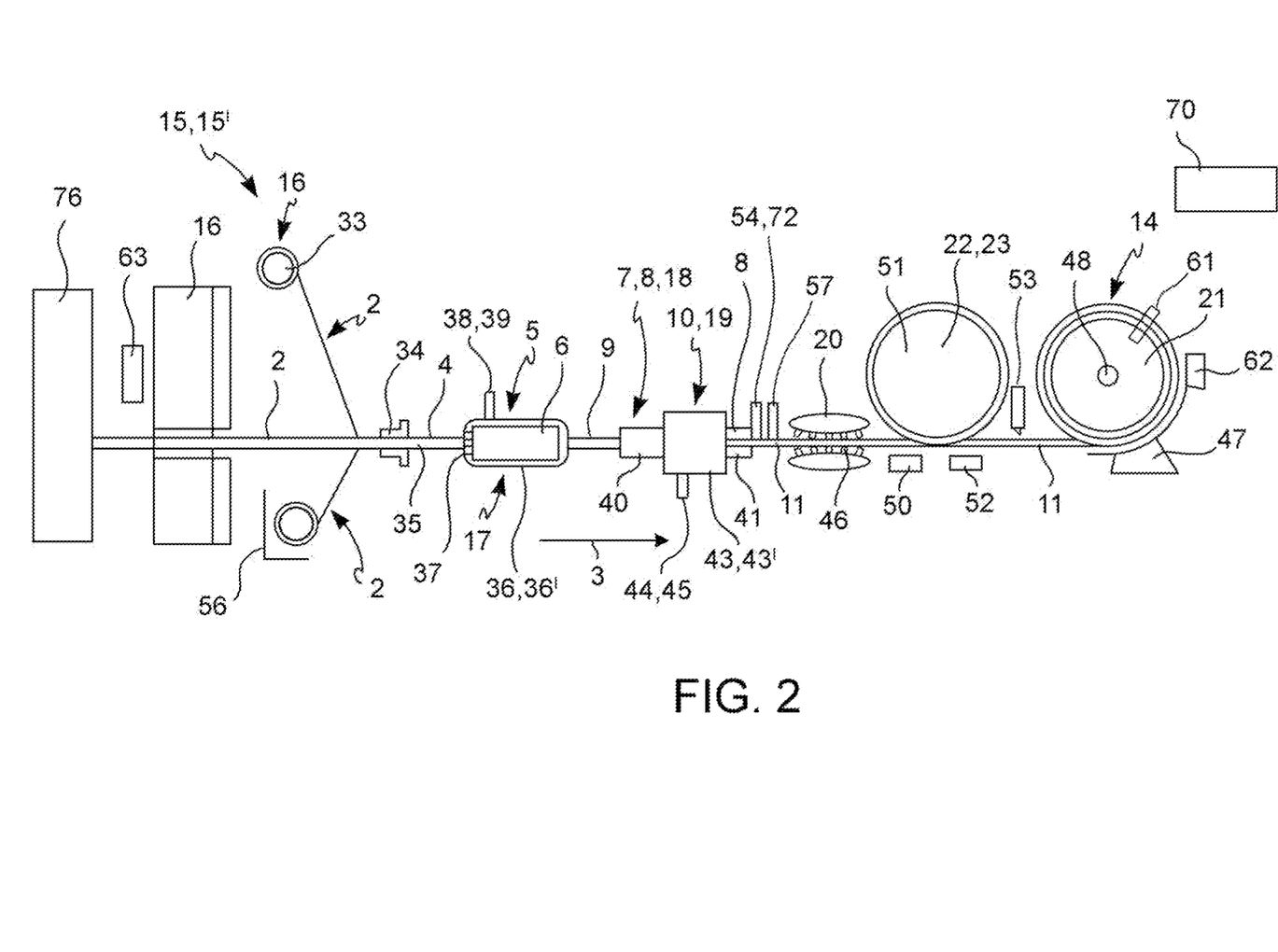
FIG. 2 is a diagrammatic view of a part of a system for manufacturing a reinforcing element for reinforced concrete, according to a further embodiment.

The auxiliary heating device 50 may comprise an electric resistor and/or a source of thermal radiation, electromagnetic, microwave, a source of ultrasound and/or a circuit or flow of a heating fluid (e.g. conveyed by means of a pump or by means of a fan) in heat exchange relationship with the bar 11.

The auxiliary cooling device 52 may comprise a circuit or flow of a cooling fluid (e.g. conveyed by means of a pump or by means of a fan) in heat exchange relationship with the bar 11.

Advantageously, the auxiliary heating device 50 can be configured to directly heat the bar 11 or one or more inlet surfaces of the bending assembly 51, e.g. one or more inlet surfaces of one or more of said bending rollers or bending belts or bending surfaces which, in turn, are in contact or in heat exchange relationship with the bar 11.

Similarly, the auxiliary cooling device 52 can be configured to cool the bar 11 directly or one or more outlet surfaces of the bending assembly 51, e.g. one or more outlet surfaces of one or more of said bending rollers or bending belts or bending surfaces which, in turn, are in contact or in heat exchange relationship with the bar 11.

For this purpose, the auxiliary heating device 50 and/or auxiliary cooling device 52 may be configured and operated for an alternating instantaneous heating and instantaneous cooling of the bar 11 or one or more thermal exchange surfaces, e.g. of segments of a roller of the bending assembly 51 in contact or in heat exchange relationship with the bar 11.

According to an embodiment (FIG. 1), the provisional bending device 22 may be arranged along the pultrusion path 4 downstream of the solidification position 10 and upstream of the pulling position 12, In this embodiment, the pulling device 20 may be configured for a (curved) engagement and a (curved) movement of the bar 11 so as not to elastically straighten the engaged bar 11.

Alternately, the pulling device 20 may be configured to engage and move the bar 11 in straight manner so as to elastically straighten the engaged bar 11 but only temporarily. In the case of even higher elastic deformations, but for very short periods, the polymeric material does not suffer creep.

According to a further embodiment (FIG. 2), the provisional bending device 22 may be arranged downstream of the pulling position 12 and upstream of the winding position 13.

The provisional curvature radius can be substantially constant or variable, e.g. in gradual manner, so as to adapt to the rolled configuration of the bar 11 in a coil 14, in order to minimize residual elastic tensions in the coil 14.

According to an embodiment, the provisional manufacturing assembly 15' may comprise a cutting device 53 arranged upstream of the winder 21 and which can be configured or actuated to cut the bar 11 when the winding on the coil 14 is completed.

According to a further embodiment, the provisional manufacturing assembly 15' may comprise a granulate applicator 54 which applies and pastes a granulate 55, e.g. sand, on the outer surface 42 of the bar 11. The granulate 55 can be applied on the composite thread 9 not yet solidified or on the solidified bar 11. The granulate 55 is glued by applying an adhesive onto the outer surface 42 or by exploiting the adhesive capacity of the thermoplastic polymer resin of the bar 11.

According to further embodiments, the provisional manufacturing assembly 15' may comprise a profiling device 41 with one or more profiling molds, e.g. in a double belt profiling mold system, which impart a low-relief, non-slip 43 profile onto the outer surface 42 of the composite thread 9 (FIG. 9) or which can be heated in order to be able to impress a low-relief, non-slip profile 43 onto the outer surface 42 of the solidified bar 11.

Figure 10:
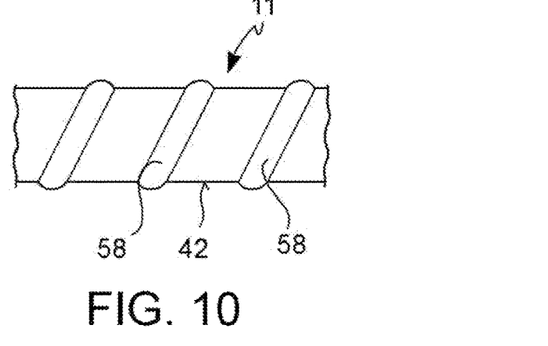
FIG. 10 shows an outer surface, profiled by virtue of a profiling thread of the reinforcing element for reinforced concrete made using the system and method according to embodiments.

Either alternatively or additionally, the profiling device 41 makes a helical undulation at the outer surface 42 of the reinforcing bar 11, by applying a profiling wire 58 in helical manner on or in the polymeric resin 6 either at or near the outer surface 42 (FIG. 10).

Either alternatively or additionally to the profiling device 41, the provisional manufacturing assembly 15' may comprise a surface treatment device 72 configured to perform a chemical treatment of the outer surface 42 of the reinforcement bar 11, e.g. by applying or making an activatable surface layer 73, containing a substance which can be activated as an adhesive, preferably different from the polymeric resin 6.

Figure 11:
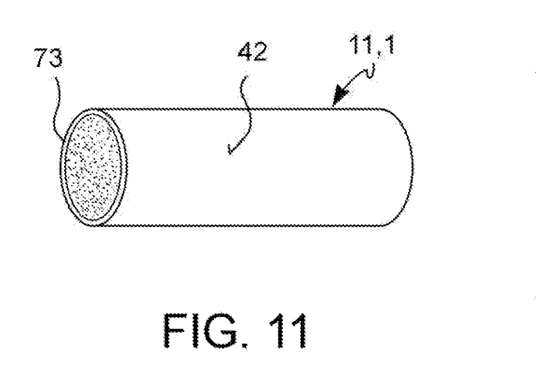
FIG. 11 shows a section of a reinforcing element for reinforced concrete made by the system and the method according to an embodiment.
Figure 12:
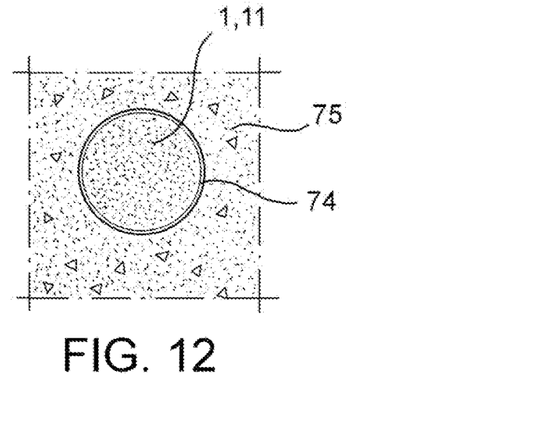
FIG. 12 is a section view of a portion of reinforcing element according to FIG. 11 embedded in concrete.

The activatable layer 73 comprises (a component of) an activatable adhesive by means of an activation substance, e.g. an activation additive, mixed into the concrete, so that the embedding of the bar 11 in the fresh concrete triggers the activation of the activatable layer 73 and, consequently, the formation of an adhesive interface 74 between the bar 11 and surrounding concrete 75 (FIG. 11).

This increases the resistance against extraction of the bar 11 or of the reinforcing element 1 with smooth or profiled outer surface 42.

Figure 7:
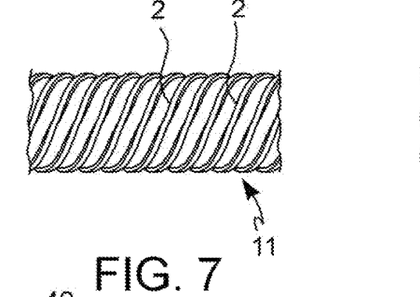
FIG. 7 shows a twisted configuration of a reinforcing fiber bundle of the reinforcing element for reinforced concrete, made by means of the system and method according to embodiments.
Figure 8:
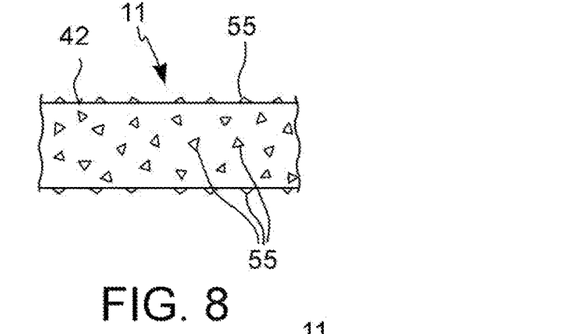
FIG. 8 shows an outer surface, provided with non-slip grains (enlarged) of the reinforcement element for reinforced concrete made using the system and method according to embodiments.

In order to overcome a potential risk of buckling of the reinforcing fibers (bending phenomenon and transverse displacement under longitudinal compression) during future definitive shaping of the reinforcing bar 11, it is advantageous to subject the reinforcing fiber bundle 2, either before or after impregnation with resin but before solidification, to a twisting or spiraling so as to obtain, in the solidified reinforcing bar 11, a twisted or helical configuration at least the eccentric reinforcing fibers with respect to a central longitudinal axis of the bar 11 (FIG. 7).

For this purpose, the provisional manufacturing assembly 15' may comprise a twisting device 56 which performs a twisting of the fiber bundle 2. According to an advantageous embodiment, the twisting device 56 is associated with the fiber feeder 16 and can be configured, for example, to turn the fiber feeder 16 with respect to the pultrusion path 4, so as to obtain the twisting of the reinforcing fiber bundle 2.

The provisional manufacturing assembly 15' may also comprise a marking device 57 which applies a linear or spiral marking by means of colored printing and/or by means of the application of a colored wire to the not yet solidified composite thread 9 or to the solidified composite bar 11.

The wound coils 14 can be locked in compact configuration by means of one or more bands 61. Locking may occur automatically by means of binding device 62 of provisional manufacturing assembly 15'.

The bands are advantageously made of (either synthetic or natural) fabric and with no sharp edges to prevent cuts in the outer surface 42 of the wound bars 11.

According to an embodiment, the method may comprise a step of annealing of the bar 11 wound in a coil 14, by heating of the entire coil 14 to an annealing temperature, in order to either reduce or eliminate residual elastic strains and/or in order to modify, preferably increase, the glass transition temperature of the thermoplastic polymer matrix 6 of the bar 11.

Similarly, the provisional manufacturing assembly 15' may comprise an annealing device 70 configured to heat the coil 14 to an annealing temperature and successively cooling the coil 14 either actively (by cooling means) or passively by means of a cooling space or cooling path at room temperature.

The provisional manufacturing assembly 15' comprises an electronic control system 63 in connection with either one, or a plurality of, or all devices 16, 17, 18, 19, 20, 21, 22, 39, 44, 45, 48, 50, 52, 53, 54, 56, 57, 62, 70 and configured to control them and actuate them in synchronized and, preferably, in continuous manner, for a continuous operation of the provisional manufacturing assembly 15'.

According to advantageous embodiments for the application of the bar 11 for reinforcing reinforced concrete, the thermoplastic polymer resin 6 is chosen so:
- as to have a glass transition temperature higher than 100° C., preferably higher than 110° C., advantageously equal to or higher than 150° C., and/or
- that the bar 11 has a specific weight in the range from 1850 kg/m$^3$ to 2200 kg/m$^3$, preferably from 1950 kg/m$^3$ to 2000 kg/m$^3$.

Advantageously, the amount of the reinforcing fibers 2 is chosen so that the reinforcing bar 11 has a fiber content (in volume) in the range from 70% to 80% of the total volume of the bar 11.

Figure 6:
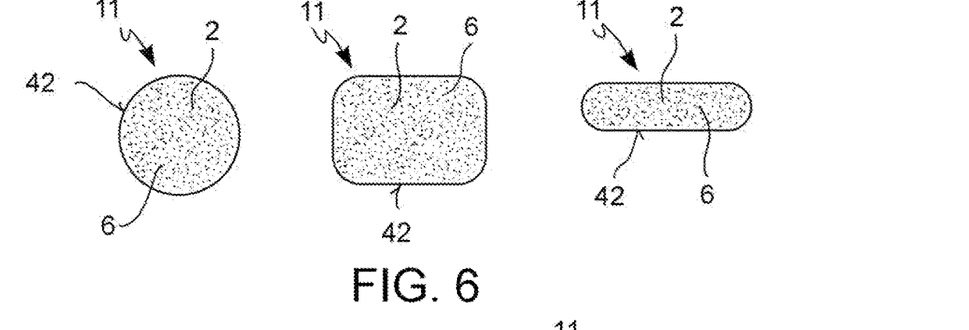
FIG. 6 shows cross section views of a reinforcing element for reinforced concrete made using the system and method according to the embodiments.

Again according to advantageous embodiments for the application of the bar 11 for reinforcing reinforced concrete, the forming device 18, in particular the forming channel 8, is configured so as to make the bar 11 with a cross-section substantially either circular or rectangular (e.g. with beveled edges), square or non-square, or oval or flat (FIG. 6), and possibly with rough or non-slip profiling of the outer surface 42.

The diametrical dimensions or cross diameters of the bar 11 are preferably chosen from the group consisting of 6 mm, 8 mm, 10 mm, 12 mm, 13 mm, 14 mm, 16 mm, 18 mm, 19 mm, 20 mm, 22 mm, 24 mm, 25 mm, 26 mm, 28 mm, 29 mm, 30 mm, 32 mm, 34 mm, 36 mm, 40 mm, 43 mm, 50 mm, 57 mm, 60 mm.

According to preferred embodiments, the coils 14 are made according to the dimensions and/or specific and total weights shown in the following table.

| Weight of coil 14 (kg) | | from 575 to 675, or about 625 | from 700 to 800, or about 750 | from 750 to 1750, or about 1250 |
|---|---|---|---|---|
| Diameter of bar 11 (mm) | Weight of bar 11 (kg/m) | Total development of coil 14 (m) | Total development of coil 14 (m) | Total development of coil 14 (m) |
| 6 | from 0.05 to 0.06, or about 0.0555 | 11261 | 13514 | 22522 |
| 8 | from 0.093 to 0.104, or about 0.09875 | 6329 | 7595 | 12658 |
| 10 | from 0.15 to 0.16 or about 0.154 | 4052 | 4862 | 8104 |
| 12 | from 0.214 to 0.230, or about 0.222 | 2815 | 3378 | 5631 |
| 14 | from 0.29 to 0,31, or about 0.3025 | 2066 | 2479 | 4132 |
| 16 | from 0.33 to 0.46, or about 0.395 | 1582 | 1899 | 3165 |

According to an embodiment, the bar 11 is wound in a coil 14 with a provisional curvature radius equal to or greater than five, preferably six times the diameter of the bar 11.

Detailed Description of the Steps and Means of Storing and Transporting Coils 14 of Reinforcing Bar 11

Figure 4:
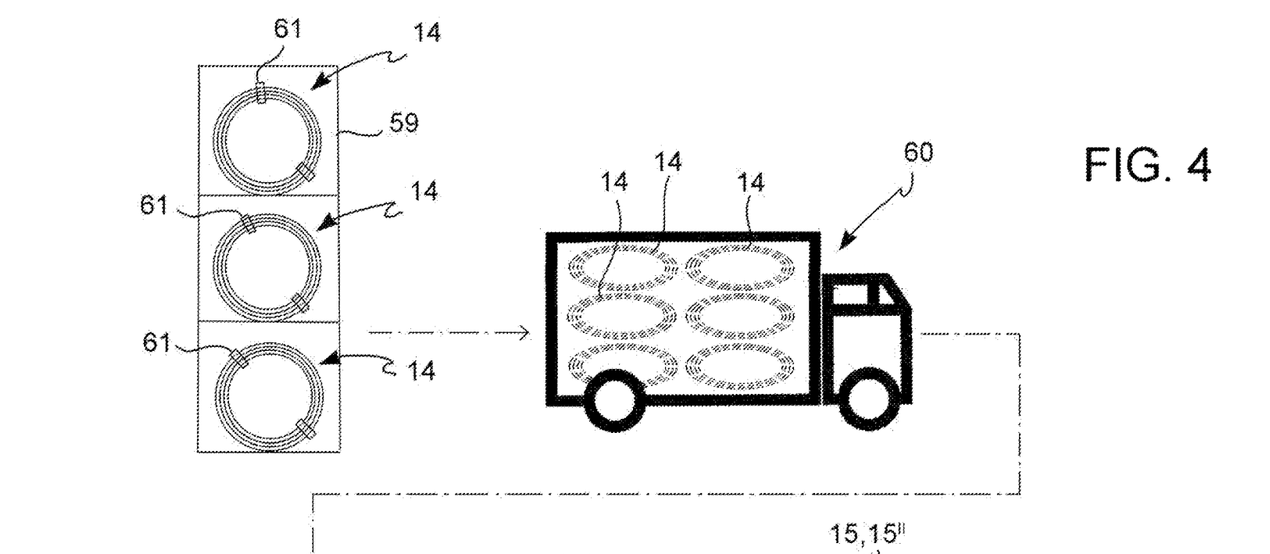
FIG. 4 illustrates systems and steps of method for storing and transporting a reinforcing bar wound in a coil, according to embodiments.
Figure 5:
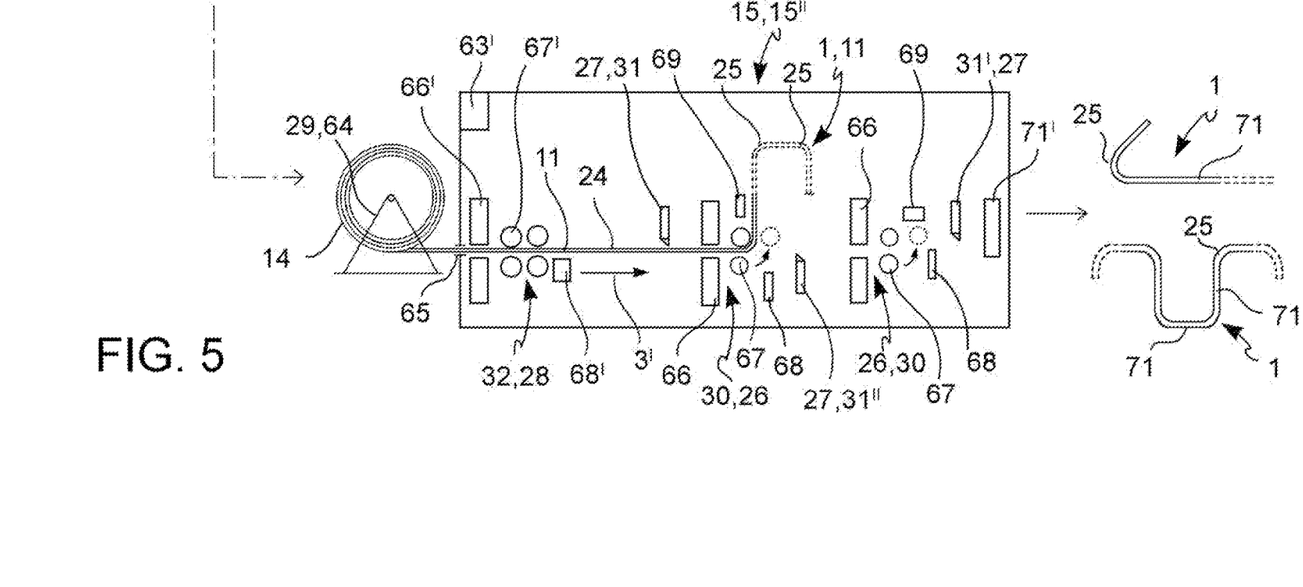
FIG. 5 is a diagrammatic view of a part of a system for manufacturing a reinforcing element for reinforced concrete, according to an embodiment.

The coils 14 of reinforcing bar 11 can be stored in suitable stores 59 and/or transported by means of transport vehicles 60 from the provisional manufacturing assembly 15' to the definitive shaping assembly 15" of the system 1 (FIG. 4), which can be very far from the provisional manufacturing assembly 15'.

This storage and transport benefits from the low weight of the thermoplastic polymeric material with respect to steel and from the configuration wound in coils 14 of the thermoplastic reinforcement bar 11.

Detailed Description of the Method and of the Definitive Shaping Assembly 15"

According to an embodiment, the unwinding device 29 comprises a coil support 64 which supports the coil 14 and, optionally, a passage opening or channel 65 which guides the bar 11 from the coil 14 towards and along the shaping path 24.

The reel holder and the passage opening 65 can be positioned so as to allow or provide an initial extension of the bar 11, from the reel 14 to the shaping path 24, curved in the same direction of winding of the coil 14. This allows reducing the elastic tensions during the unwinding of the bar 11 and reduces problems of creep, precisely in the unwinding region, in the event of a prolonged stop of the definitive shaping assembly 15".

According to an embodiment, the at least one bending device 30 may comprise:
- a heating device 66 arranged upstream of the shaping position and which heats the bar 11 locally to soften it in preparation for the definitive bend 25,
- a definitive bending assembly 67, e.g. one or more bending rollers or mandrels, or opposite belts, or opposite bending surfaces, which bend the locally heated bar 11 so as to accomplish said definitive bend 25,
- a cooling device 68 which cools the bent bar 11 to re-solidify it so as to preserve the definitive bend 25.

The heating device 66 may comprise an electric resistor and/or a source of thermal radiation, electromagnetic, microwave, a source of ultrasound and/or a circuit or flow of a heating fluid (e.g. conveyed by means of a pump or by means of a fan) in heat exchange relationship with the bar 11.

The cooling device 68 may comprise a circuit or flow of a cooling fluid (e.g. conveyed by means of a pump or by means of a fan) in heat exchange relationship with the bar 11.

Advantageously, the heating device 66 can be configured to directly heat the bar 11 or one or more inlet surfaces of the definitive bending assembly 67, e.g. one or more inlet surfaces of one or more said bending rollers or mandrels or bending belts or bending surfaces which, in turn, are in contact or in heat exchange relationship with the bar 11.

Similarly, the cooling device 68 can be configured to cool the bar 11 directly or one or more outlet surfaces of the bending assembly 67, e.g. one or more outlet surfaces of one or more of said definitive bending rollers or mandrels or bending belts or bending surfaces which in turn are in contact or in heat exchange relationship with the bar 11.

For this purpose, the heating devices 66 and/or cooling devices 68 can be configured and operatable for an alternating instantaneous heating and instantaneous cooling of the bar 11 or one or more thermal exchange surfaces, e.g. of segments of a roller or bending mandrel of the definitive bending assembly 67 in contact or in heat exchange relationship with the bar 11.

According to an embodiment, the shaping device 30 may comprise twisting means 69 which apply on the bar 11 a twist so as to twist the bar 11 at the definitive bend 25, advantageously when the bar 11 is still heated and plastically deformable in the definitive bending zone 25. The twisting means 69 may comprise gripping surfaces which can be actuated to engage the bar 11 in a gripping portion and to turn the gripping portion of the bar 11 about a longitudinal axis of the bar 11 at the definitive bending zone 25.

By superimposing a twist to the localized bend 25, peripheral reinforcing fibers subject to flexural compression are also subject to torsional traction which at least partly compensates for the flexural compression and abviates problems of buckling.

According to an embodiment, the cutting device 31 may be arranged upstream of one or more of the shaping devices 20.

Either alternatively or additionally, the cutting device 31 or a further cutting device 31" can be arranged downstream of one or more shaping devices 20 to cut a respective portion of the bar 11 after making one or more definitive bends 25 of said stretch of the bar 11.

Either alternatively or additionally, the cutting device 31 or a still further cutting device 31' can be arranged between two of said shaping devices 20 to cut a respective portion of the bar 11, e.g. after making at least one first definitive bend 25 and before making one second definitive bend 25 of said stretch of the bar 11.

According to an embodiment, the straightening device 32 may comprise:
- a heating device 66' arranged upstream of the straightening position 28 and which heats the bar 11 in continuous manner to soften it in preparation for straightening,
- a straightening assembly 67', e.g. one or more straightening rollers or opposite belts or opposite straightening surfaces which straighten the heated bar 11 in continuous manner so as to eliminate the provisional winding curvature and provide the bar 11 with a substantially rectilinear longitudinal development,
- a cooling device 68' which cools the straightened bar 11 to re-solidify it so as to retain at least temporarily the substantially rectilinear longitudinal development.

The heating device 66 may comprise an electric resistor and/or a source of thermal radiation, electromagnetic, microwave, a source of ultrasound and/or a circuit or flow of a heating fluid (e.g. conveyed by means of a pump or by means of a fan) in heat exchange relationship with the bar 11.

The cooling device 68 may comprise a circuit or flow of a cooling fluid (e.g. conveyed by means of a pump or by means of a fan) in heat exchange relationship with the bar 11.

Advantageously, the heating device 66' can be configured to directly heat the bar 11 or one or more inlet surfaces of the straightening assembly 67, e.g. one or more inlet surfaces of one or more of said straightening rollers or mandrels or straightening belts or straightening surfaces which, in turn, are in contact or in heat exchange relationship with the bar 11.

Similarly, the cooling device 68' may be configured to cool the bar 11 directly or one or more outlet surfaces of the straightening assembly 67, e.g. one or more outlet surfaces of one or more of said straightening rollers or mandrels or straightening belts or straightening surfaces which, in turn, are in contact or in heat exchange relationship with the bar 11.

For this purpose, the heating devices 66' and/or cooling devices 68' can be configured and actuated for an alternating instantaneous heating and instantaneous cooling of the bar 11 or one or more thermal exchange surfaces, e.g. of segments of a roller or bending mandrel of the straightening assembly 67' in contact or in heat exchange relationship with the bar 11.

According to an alternative or additional embodiment, the bending assembly 51 may be configured so as to make in the bar 11 or in the reinforcing element 1, between two of said definitive local bends 25, at least one straightened bar stretch 71, of substantially straight longitudinal development, so as to eliminate the aforesaid provisional curvature (which is desirable for winding in a coil 14, but undesirable in the final reinforcing element 1).

According to an embodiment, the method may comprise a step of annealing of the final reinforcing element 1, by heating one or more of said reinforcing elements 1 individually or in group, to an annealing temperature, in order to either reduce or eliminate residual elastic strains and/or in order to modify, preferably increase, the glass transition temperature of the thermoplastic polymer matrix 6 of the reinforcing element 1.

Similarly, the definitive shaping assembly 15" may comprise an annealing device 70' configured to heat one or more of said reinforcing elements 1 either individually or in group to an annealing temperature and successively cooling one or more reinforcing elements 1 either actively (by cooling means) or passively through a cooling space or path at room temperature.

The definitive shaping assembly 15" comprises an electronic control system 63' in connection with either one, or a plurality of, or all devices 29, 30, 31, 31', 31", 32, 66, 66', 67, 67', 68, 68', 69, 70' and configured to control and actuate them in synchronized and, preferably, intermittent manner, for a coordinated operation of the definitive shaping assembly 15".

According to a further embodiment, the electronic control system 63' controls one or more of the shaping device 30, the straightening device 32, the cutting device 31, 31', 31", or the twisting means 69, so as to offset conveying movements of the bar 11 caused by them so as to compensate for longitudinal thermal expansions of the bar 11.

Many of the steps of the method have been described, for the sake of brevity, directly with reference to devices and material means suited for their execution. However, for the purposes of description of the method according to the invention, all the steps of the method, operations and handling performed on the bar 11 and on the reinforcing element 1 in all the preparation and processing states are considered as described without limitation to execution by means of a specific device, system or means, and can therefore be performed also by alternative or equivalent means or devices.

The system and method according to the invention as a whole is divided into three sub-methods and systems (provisional manufacturing, storage and transport, final shaping), each of which is individually considered novel, advantageous and improving with respect to the prior art, even without the limitations of the respective other sub-systems or sub-methods.

Moreover, the invention also contemplates a successive use of the manufactured reinforcing elements 1 as reinforcing element either embedded in or applied to a concrete matrix for making reinforced concrete.

Finally, the invention also contemplates a subsequent demolition of reinforced concrete thus made, e.g. by demolition steps and means without melting or cutting steel, e.g. by reinforced concrete fracturing steps and means, e.g. by percussion steps and means and explosive detonation steps and/or means and/or by cutting steps and means for removing granulate and/or dust and/or water spraying or suction steps and means to pick up and/or collect granules and/or powders of demolished reinforced concrete containing fragments of the reinforcing element 1.

Also in these circumstances, the lightness and suitability for destruction by cutting force, destructive impact, destructive percussion and sawing of the reinforcing element 1 express considerable advantages, also with respect to the prior art.

Simultaneous Manufacturing in Parallel

Figure 13:
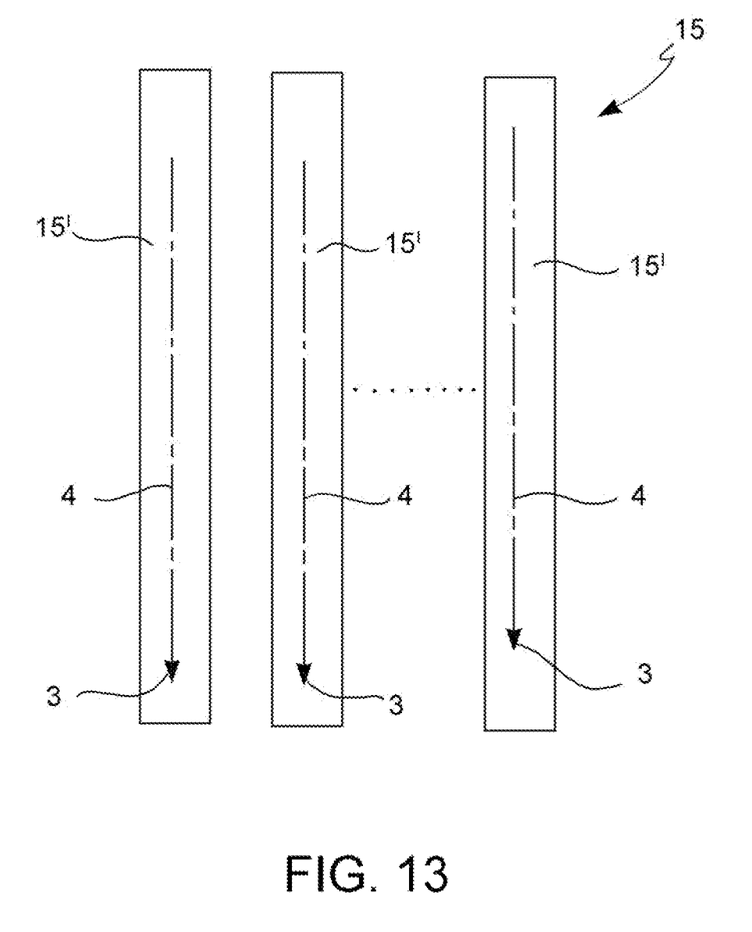
FIG. 13 diagrammatically illustrates a system and method for the parallel and simultaneous manufacturing of a plurality of reinforcing elements, according to a further aspect of the invention.

According to a further aspect of the invention, the system 15 comprises a plurality of said provisional manufacturing assemblies (15') each defining its own pultrusion path (4) and arranged next to one another in a direction transverse to said plurality of pultrusion paths (4).

In particular:

said fiber feeder (16) belongs to a group of more than one feeders (16) or is configured as a single feeder (16), with multiple reels (33) of fibers (2) and with multiple redirecting and guiding surfaces (34) which guide and join the fibers (2) unwound by the coils (33) to form a plurality of reinforcing fiber bundles (2) for said plurality of provisional manufacturing assemblies (15'), said impregnating device (17) belongs to a group of multiple impregnating devices (17) or is configured as a single impregnating device (17), with only one impregnation tank (36) shared among the plurality of provisional manufacturing assemblies (15') or with a plurality of impregnating tanks (36) to impregnate said plurality of reinforcing fiber bundles (2) with the liquid thermoplastic polymeric resin (6) or with thermoplastic polymer resin liquid precursor, so as to obtain a plurality of said impregnated fiber bundles (2), said forming device (18) belongs to a group of multiple forming devices (18) or is configured as a single forming device (18), comprising a plurality of said forming channels (8) through which the fiber bundles (2) impregnated with resin (6) are conveyed so as to form a plurality of said composite threads (9) not yet solidified, each with a sectional shape determined by the forming channel (8), said solidification device (19) belongs to a group of multiple solidification devices (19) or is configured as a single solidification device (19), with a plurality of heat-adjustable molds (43, 43'), which in particular can be heated or cooled to cause the solidification of the thermoplastic polymer resin or to cause the polymerization of the resin precursor so as to form a plurality of said solidified thermoplastic fiber-reinforced bars (11), said pulling device (20) either belongs to a group of multiple pulling devices (20) or is configured as a single pulling device (20), which group or single tensioning device (20) applies a pulling force in the advancement direction (3) on each of said solidified bars (11), independently and simultaneously, said winder (21) belongs to a group of multiple winders (21) or is configured as a single winder (21), which group or single winder (21) winds each of said solidified bars (11), separately and simultaneously, to form a plurality of said coils (14) of solidified bar (11), if provided, said provisional bending device (22) belongs to a group of multiple provisional bending devices (22) or is configured as a single provisional bending device (22), which group or single provisional bending device (22) acts on each of said solidified bars (11) separately and simultaneously.

Similarly, the method may comprise the step of simultaneously manufacturing a plurality of said reinforcing elements (1) using a plurality of provisional manufacturing assemblies (15'), each defining its own pultrusion path (4) and arranged next to one another in a direction transverse to said pultrusion paths (4).

Definitive Shaping of Straight Bars 11 and/or Bars not Wound in a Coil

According to a further aspect of the invention, applicable to straight bars 11 and/or bars not wound in a coil, the system (15) for manufacturing a reinforcing element (1) for reinforced concrete in the form of a bar shaped with at least one bend, starting from a solidified thermoplastic fiber-reinforced bar (11), not wound in a coil, may comprise a definite shaping assembly (15") having:

- a supporting and feeding device (29) which supports the bar (11) and feeds the bar (11), straight or non-wound on a coil, in an advancement direction (3') along a shaping path (24),
- at least one shaping device (30), arranged in a shaping position (26) along a shaping path (24), and which locally heats the bar (11) to soften it, bends the locally heated bar (11) to achieve a definitive local bend (25) and then cools the bar (1) at the definitive local bend (25) to solidify it again,
- optionally, a cutting device (31), arranged in a cutting position (27) along the shaping path (24), which cuts the bar (11) to obtain a single reinforcing element (1).

Similarly, a method for manufacturing a reinforcing element (1) for reinforced concrete in the form of a bar shaped with at least one bend, starting from a solidified thermoplastic fiber-reinforced bar (11), may comprise:

- supporting the bar (11) and conveying the bar (11) in an advancement direction (3') along a shaping path (24),
- in a shaping position (26) along the shaping path (24), locally heating the bar (11) to soften it, bending the locally heated bar (11) to achieve a definitive local bend (25) and then cooling the bar (11) at the definitive local bend (25) to solidify it,
- optionally, in a cutting position (27) along the shaping path (24), cutting the unwound bar (11) to obtain a single reinforcing element (1).

The invention claimed is:

1. A system for manufacturing a bar-shaped reinforcing element for reinforced concrete with at least one bend, starting from a solidified thermoplastic fiber-reinforced bar, said system comprising a definitive shaping assembly having:
   - a supporting and feeding device which supports the bar and feeds the bar along an advancement direction along a shaping route;
   - at least one shaping device, arranged in a shaping position along a shaping path, and which locally heats the bar to soften it, bends the locally heated bar to make a definitive local bend and then cools the bar at the definitive local bend to solidify it again, wherein the shaping device comprises a twisting means which apply a twisting on the bar so as to twist the bar at the definitive bend; and
   - optionally, a cutting device, arranged in a cutting position along the shaping path, which cuts the bar to obtain a single reinforcing element;
   - wherein said supporting and feeding device comprises at least one of:
     A) an unwinding device, which supports said bar wound in a coil and unwinds the bar from the coil and feeds in an advancement direction along a shaping route; or
     B) a supporting and feeding device of said bar not wound in a coil.

2. The system according to claim 1, comprising said unwinding device and wherein the unwinding device comprises a coil support which supports the coil and guiding means for guiding the bar from the coil towards the shaping path.

3. The system according to claim 1, wherein the at least one shaping device comprises:
   - a heating device arranged upstream of the shaping position and which heats the bar only locally to soften it in preparation for the definitive bend;
   - a definitive bending assembly with one or more bending members which bend the locally heated bar so as to accomplish said definitive bend; and
   - a cooling device which cools the bent bar to re-solidify it so as to preserve the definitive bend.

4. The system according to claim 3, wherein the bending assembly is configured so as to make in the bar between respectively two of said local bends at least one straightened bar section having a substantially rectilinear longitudinal development so as to eliminate said provisional curvature.

5. The system according claim 1, wherein the definitive shaping assembly further comprises a straightening device, arranged in a straightening position along the shaping path upstream of the shaping position, and which heats the bar to soften it, straightens the heated bar to eliminate a provisional curvature and then cools the straightened bar to solidify it again.

6. The system according to claim 5, wherein the straightening device comprises:
   - a heating device which heats the bar in continuous manner to soften it in preparation for straightening;
   - a straightening assembly with one or more straightening members which straighten the heated bar in continuous manner so as to eliminate a provisional winding curvature and providing the bar with a substantially rectilinear longitudinal development; and
   - a cooling device which cools the straightened bar to re-solidify it so as to retain at least temporarily a substantially straight longitudinal development.

7. The system according to claim 1, wherein the definitive shaping assembly comprises an annealing device configured to heat said reinforcing elements to an annealing temperature and then cooling the reinforcing element.

8. The system according to claim 1, wherein the definitive shaping assembly comprises an electronic control system configured for controlling and actuating the definitive shaping assembly in intermittent manner; and
   - wherein the electronic control system controls one or more of the shaping device, a straightening device, the cutting device and the twisting means so as to offset the conveying movements of the bar caused by them so as to compensate for longitudinal thermal expansions of the bar.

9. The system according to claim 1, wherein the electronic control system controls one or more of the shaping device, a straightening device, the cutting device and the twisting means so as to offset conveying movements of the bar to compensate for longitudinal thermal expansions of the bar.

10. The system according to claim 1, comprising a provisional manufacturing assembly (15') having:
    - a fiber feeder which feeds a reinforcing fiber bundle in an advancement direction along a pultrusion path;
    - an impregnating device, arranged in an impregnating position along the pultrusion path, which impregnates the reinforcing fiber bundle so as to obtain an impregnated fiber bundle, wherein the reinforcing fiber bundle is impregnated with one of: a liquid thermoplastic polymeric resin, a liquid thermoplastic polymer resin precursor, or a liquid thermoplastic polymer resin comprising a thermoplastic resin obtained by heating and softening of thermoplastic granules;

a forming device, arranged in a forming position along the pultrusion path downstream of the impregnation position, which comprises a forming channel through which the fiber bundle impregnated with resin is conveyed so as to form a composite thread not yet solidified with a sectional shape determined by the forming channel;

a solidification device, arranged in a solidification position along the pultrusion path either downstream or at the forming position, which performs a solidification treatment on the composite thread, so as to form a solidified thermoplastic fiber-reinforced bar;

a pulling device arranged in a pulling position along the pultrusion path downstream of the solidification position, which applies on the solidified bar a pulling force in the advancement direction which holds the reinforcing fiber bundle taut along the pultrusion path and conveys the solidified bar towards a winding position;

a winder, arranged in the winding position, which winds the solidified bar to form a coil of said solidified bar;

a provisional bending device, arranged in a provisional bending position upstream of the winding position, and that:

bends the composite thread not yet solidified or heats the solidified bar to soften it, bends the heated bar and then cools the bar to solidify it again;

so as to confer to the solidified bar a continuous provisional curvature in a direction of the subsequent winding in the coil.

11. The system according to claim 1, comprising a provisional manufacturing assembly having:

a fiber feeder which feeds a reinforcing fiber bundle in an advancement direction along a pultrusion path;

an impregnating device, arranged in an impregnating position along the pultrusion path, which impregnates the reinforcing fiber bundle with a liquid thermoplastic polymeric resin or with a liquid thermoplastic polymer resin precursor or with a liquid thermoplastic polymer resin comprising a thermoplastic resin obtained by heating and softening of thermoplastic granules so as to obtain an impregnated fiber bundle;

a forming device, arranged in a forming position along the pultrusion path downstream of the impregnation position, which comprises a forming channel through which the fiber bundle impregnated with resin is conveyed so as to form a composite thread not yet solidified with a sectional shape determined by the forming channel;

a solidification device, arranged in a solidification position along the pultrusion path downstream or at the forming position, which performs a solidification treatment or at least partial hardening treatment on the composite thread, so as to form the solidified thermoplastic fiber-reinforced bar;

a pulling device, arranged in a pulling position along the pultrusion path downstream of the solidification position, which applies a pulling force on the solidified bar in the advancement direction which holds the reinforcing fiber bundle taut along the pultrusion path and conveys the solidified bar towards a winding position; and a winder, arranged in the winding position, which winds the solidified bar to form the coil of said solidified bar;

so as to confer to the solidified bar a continuous provisional curvature in a direction of the winding in the coil.

12. The system according to claim 11, wherein the forming channel comprises a profiling portion with one or more profiling molds which impart a non-slip profile in relief on an outer surface of the composite thread.

13. The system according to claim 11, wherein the solidification device comprises:

a coolable mold and a cooling system which causes the solidification of the thermoplastic polymer resin to form a solidified thermoplastic polymeric matrix; or a heatable mold and a cooling system which causes the polymerization of the thermoplastic polymer resin precursor to form a thermoplastic polymeric matrix.

14. The system according to claim 11, wherein the provisional manufacturing assembly comprises one or more of:

a granulate applicator which applies and glues a granulate onto an outer surface of the bar;

a profiling device with a profiling mold which imparts a non-slip profile to an outer surface of the composite thread;

a profiling device with a heatable profiling mold which imparts a low-relief non-slip profile onto the outer surface of the bar; and a profiling device configured to make a helical undulation at the outer surface of the reinforcing bar, by applying a profiling wire in helical manner in the polymeric resin either at or near the outer surface.

15. The system according to claim 11, wherein the provisional manufacturing assembly comprises a twisting device which performs a twisting of the fiber bundle.

16. The system according to claim 11, wherein the provisional manufacturing assembly comprises a binding device for blocking the coil in compacted configuration by applying one or more bands.

17. The system according to claim 11, wherein the provisional manufacturing assembly 15' comprises an annealing device configured to heat the coil to an annealing temperature and then cooling the coil.

18. The system according to claim 11, further comprising a plurality of provisional manufacturing assemblies each defining its own pultrusion path and arranged next to one another in a direction transverse to said plurality of pultrusion paths.

19. The system according to claim 11, comprising a device for the production of glass thread or for the production of fibers or fiber filaments in general, arranged upstream of the fiber feeder and configured to make reinforcing fibers in said reinforcing fiber bundles.

20. The system according to claim 11, wherein the forming device is configured to operate in continuous manner.

21. The system according to claim 11, wherein the solidification device comprises a heatable mold and a cooling system which causes the polymerization of the thermoplastic polymer resin precursor to form a thermoplastic polymeric matrix.

22. The system according to claim 11, wherein the winder forms and performs the function of the pulling device.

23. The system according to claim 11, wherein the winder comprises a coil support adapted to support and retain the coil being formed and a winding motor associated with the coil support and which can be actuated to rotate the coil so as to wind the bar on the coil.

24. The system according to claim 11, wherein the provisional bending device comprises a bent section formed in said forming channel.

25. The system according to claim 11, wherein the provisional bending device comprises:
- an auxiliary heating device arranged downstream of the solidification position and which heats the previously solidified bar to soften it in preparation for the provisional bending;
- a bending assembly with one or more bending assemblies which force the heated bar along a curved advancement section having said provisional curvature;
- an auxiliary cooling device which cools the bent bar to solidify it so as to preserve the provisional curvature.

26. The system according to claim 11, wherein:
the provisional bending device is arranged along the pultrusion path downstream of the solidification position and upstream of the pulling position; and
the pulling device is configured to engage and move the bar in a curved manner so as not to elastically straighten the engaged bar.

27. The system according to claim 11, wherein:
the provisional bending device is arranged along the pultrusion path downstream of the solidification position and upstream of the pulling position; and
the pulling device is configured to engage and move the bar in a rectilinear fashion so as to elastically, but only temporarily, straighten the engaged bar.

28. The system according to claim 11, wherein the provisional bending device is arranged downstream of the pulling position and upstream of the winding position.

29. The system according to claim 11, wherein the provisional manufacturing assembly comprises an electronic control system configured for controlling and actuating the provisional manufacturing assembly in continuous and synchronized manner.

30. A method for manufacturing a bar-shaped reinforcing element for reinforced concrete with at least one bend, starting from a solidified thermoplastic fiber-reinforced bar wound in a coil, comprising:
- unwinding the bar from the coil and conveying the unwound bar in an advancement direction along a shaping path;
- in a shaping position along the shaping path, locally heating the bar to soften it, bending the locally heated bar to make a definitive local bend;
- applying a twist to the bar at the definitive local bend;
- cooling the bar at the definitive local bend to solidify it; and
- in a cutting position along the shaping route, cutting the unwound bar to obtain a single reinforcing element.

31. The method according to claim 30, comprising:
conveying a reinforcing fiber bundle in an advancement direction along a pultrusion path,
in an impregnating position along the pultrusion path, impregnating the reinforcing fiber bundle with a liquid thermoplastic polymer resin precursor or with a liquid thermoplastic polymeric resin so as to obtain an impregnated fiber bundle;
in a forming position along the pultrusion path downstream of the impregnation position, conveying the impregnated fiber bundle through a forming channel so as to form a composite thread not yet solidified with a sectional shape determined by the forming channel;
in a solidification position along the pultrusion path either downstream or at the forming position, subjecting the composite thread to a solidification treatment or at least partial hardening treatment, so as to form a solidified thermoplastic fiber-reinforced bar;
in a pulling position along the pultrusion path downstream of the solidification position, applying to the solidified bar a pulling force in the advancement direction to hold the reinforcing fiber bundle taut along the pultrusion path and to convey the solidified bar towards a winding position;
in the winding position, winding the solidified bar to form said coil of said solidified bar; and
in a provisional bending position upstream of the winding position:
bending the composite thread not yet solidified or
heating the solidified bar to soften it, bending the heated bar and then cooling the bar to solidify it again,
so as to confer a continuous provisional curvature to the solidified bar in the direction of the subsequent winding in the coil.

32. The method according to claim 30, comprising storing the coil of bar-shaped reinforcing element in a store and transporting the coil of bar-shaped reinforcing element via a transport vehicle to a site for a subsequent definitive formation of the reinforcing elements.

33. The method according to claim 30, comprising:
conveying a reinforcing fiber bundle in an advancement direction along a pultrusion path;
impregnating, in an impregnating position along the pultrusion path, the reinforcing fiber bundle with a liquid thermoplastic polymer resin precursor or with a liquid thermoplastic polymeric resin so as to obtain an impregnated fiber bundle;
conveying, in a forming position along the pultrusion route downstream of the impregnation position, the impregnated fiber bundle through a forming channel so as to form a composite thread not yet solidified with a sectional shape determined by the forming channel;
subjecting, in a solidification position along the pultrusion route either downstream or at the forming position, the composite thread to a solidification or at least partial hardening treatment, so as to form a solidified thermoplastic fiber-reinforced bar;
applying, in a pulling position along the pultrusion route downstream of the solidification position, to the solidified bar a pulling force in the advancement direction to hold the reinforcing fiber bundle taut along the pultrusion route and to convey the solidified bar towards a winding position; and
winding, in the winding position, the solidified bar to form said coil of said solidified bar, so as to confer to the solidified bar a continuous provisional curvature in the winding direction on the coil.

34. A method for manufacturing a bar-shaped reinforcing element for reinforced concrete with at least one bend, starting from a solidified thermoplastic fiber-reinforced bar, said method comprising:
supporting the bar and conveying the bar in an advancement direction along a shaping path;
in a shaping position along the shaping route, locally heating the bar to soften it, bending the locally heated bar to achieve a definitive local bend, applying a twist to the bar at the definitive local bend, then cooling the bar at the definitive local bend to solidify it; and
optionally, in a cutting position along the shaping route, cutting the bar to obtain a single reinforcing element.

* * * * *